(12) United States Patent
Huo (10) Patent No.: US 9,945,412 B2
(45) Date of Patent: Apr. 17, 2018

(54) R-TYPE THREAD (71) Applicant: Dongguan Guanhong Hardware Technology Co., Ltd, Guangdong (CN)

(72) Inventor: Yongjiu Huo, Heilongjiang (CN)

(73) Assignee: Dongguan Guanhong Hardware Technology Co., Ltd., Dongguan (CN)

( * ) Notice: Subject to any disclaimer, the term of this patent is extended or adjusted under 35 U.S.C. 154(b) by 0 days.

(21) Appl. No.: 15/046,828

(22) Filed: Feb. 18, 2016

(65) Prior Publication Data
US 2017/0204894 A1  Jul. 20, 2017

(30) Foreign Application Priority Data

Jan. 18, 2016 (CN) .......................... 2016 1 0031951

(51) Int. Cl.
F16B 35/04 (2006.01)
F16B 39/30 (2006.01)
F16B 33/02 (2006.01)

(52) U.S. Cl.
CPC .............. *F16B 39/30* (2013.01); *F16B 33/02* (2013.01); *F16B 35/04* (2013.01)

(58) Field of Classification Search
CPC ........... F16B 33/02; F16B 35/04; F16B 39/30
USPC .................................................. 411/411, 436
See application file for complete search history.

(56) References Cited

U.S. PATENT DOCUMENTS

| | | | | |
|---|---|---|---|---|
| 3,323,402 A * | 6/1967 | Gowen, Jr. | .............. | B21H 3/02 411/411 |
| 3,385,340 A * | 5/1968 | Evans | .................... | B21H 3/025 411/310 |
| 4,023,914 A * | 5/1977 | Holmes | .................... | B23G 5/06 408/220 |
| 4,076,064 A * | 2/1978 | Holmes | .................... | F16B 33/02 411/285 |
| 4,171,012 A * | 10/1979 | Holmes | .................... | F16B 33/02 411/285 |
| 4,549,754 A * | 10/1985 | Saunders | .............. | E21B 17/042 285/334 |

(Continued)

FOREIGN PATENT DOCUMENTS

CN       101893030 A     11/2010
CN       202991800 U      6/2013

(Continued)

OTHER PUBLICATIONS

First Office Action for Chinese Application No. CN201610031951.4, filed on Jan. 18, 2016.

(Continued)

*Primary Examiner* — Roberta S Delisle (74) *Attorney, Agent, or Firm* — Munck Wilson Mandala, LLP (57) ABSTRACT

An R-type thread belongs to the field of fasteners. Both lateral sides of a thread tooth form are a first lead-in side angle line and a second lead-in side angle line respectively. The first lead-in side angle line and the second lead-in side angle line are connected through a transition line. The transition line is concaved in a direction away from a crest. The present technical solution overcomes the defect of the existing threads of being easy to get loose after assembled, providing the R-type thread which has the functions of resisting vibration and looseness.

13 Claims, 5 Drawing Sheets

(56) References Cited

U.S. PATENT DOCUMENTS

| | | | | |
|---|---|---|---|---|
| 4,907,926 | A * | 3/1990 | Wing | F16B 33/02 411/366.3 |
| 5,060,740 | A * | 10/1991 | Yousef | E21B 17/0426 175/415 |
| 5,127,784 | A * | 7/1992 | Eslinger | F16L 15/006 285/334 |
| 5,165,731 | A * | 11/1992 | Kimuta | F16L 41/007 285/220 |
| 6,467,818 | B1 * | 10/2002 | Snapp | E21B 17/042 285/334 |
| 7,416,374 | B2 * | 8/2008 | Breihan | F16B 33/02 285/334 |
| 8,671,547 | B2 * | 3/2014 | Matsubayashi | F16B 39/30 29/525.01 |
| 2008/0089759 | A1 | 4/2008 | Diekmeyer | |
| 2012/0195713 | A1 * | 8/2012 | Gu | F16L 15/06 411/411 |

FOREIGN PATENT DOCUMENTS

| | | |
|---|---|---|
| CN | 205478844 U | 8/2016 |
| EP | 1655500 A1 | 5/2006 |
| EP | 2541078 A1 | 1/2013 |
| JP | 2014206234 A | 10/2014 |
| WO | 2011105225 A1 | 9/2011 |

OTHER PUBLICATIONS

English Translation of Search Report for Chinese Application No. CN201610031951A, filed on Jan. 18, 2016.

* cited by examiner

R-TYPE THREAD

CROSS-REFERENCE TO RELATED APPLICATIONS

This application claims priority to and/or benefit from Chinese Application No. CN201610031951.4, filed on Jan. 18, 2016, entitled "一种R型螺纹", the specification of which is incorporated by reference herein in its entirety.

TECHNICAL FIELD

The present invention relates to the field of fasteners, and particularly to an R-type thread.

BACKGROUND

Since the first industrial revolution, fasteners have been developed rapidly, and played a very important role in the boom of industry. However, all the existing fasteners have a fatal weakness, i.e., it would automatically loosen in severe vibration. Threads are indispensable in the modern society. Loosening of a fastener may cause damage and disintegration of a part of a device or a complete device, and more significantly, lead to a major safety accident. For example, US Boeing Company, by investigation, found that one of causes of frequent accidents of 737 passenger planes is fall-off of a bolt of an aircraft wing. During US Sports Aviation Expo in Sebring, Fla., USA, a fatal crash happened to a Remos GX airplane, and the crash was caused by unfastening of a fastener of an aileron, resulting in one photographer dead and a pilot seriously wounded. It was reported from JR West Japan Railway Company that because an aluminum casing fell off and flew away due to its screw being loose, the Train "Sakura No. 561", from Shin-Osaka to Kagoshima-chuo, hit the train, and went straight to power lines, causing short circuit and power failure.

Since fasteners appeared, scientists and engineers of many countries in the world have made numerous experiments and researches to delay the time of auto-loosening of the fasteners to a certain extent with a variety of methods, but the problem is not solved fundamentally. In the upcoming fourth industrial revolution, there will be higher demands for fasteners undoubtedly.

The loosening of threads is mainly due to a lateral clearance presented in engagement of the threads. When there is vibration, a basic element, "lead angle of thread", of the thread becomes the "loose angle of thread". In US, it has once proposed that a wedge-shaped thread, having a 30° angle with an axis, is made at a sharp corner of an inner tooth. Such a thread indeed improved the self-locking ability of the thread. But it can be seen from stress analysis that the thread has a great side force when stressed, especially at the initial stage of the stress. Local stress of a single tooth pattern is quite large, causing un-uniform stresses of teeth of the thread, therefore, the recycling of the fasteners has short life.

SUMMARY

An object of the present invention is to provide an R-type thread to overcome the above mentioned problems.

The present invention is realized in the following way.

In an R-type thread provided by the present invention, both lateral sides of a tooth of a thread (thread tooth form) are a first lead-in side angle line and a second lead-in side angle line respectively, the first lead-in side angle line and the second lead-in side angle line are connected through a transition line, and the transition line is concaved in a direction away from a crest of the tooth.

The "thread tooth form" determines a geometrical shape of a thread, including diameters (outer diameter, pitch diameter, and inner diameter) of a workpiece, with main parameters such as thread angle, thread oblique angle, pitch, helical angle, number of starts (number of threads) and so on. The "first lead-in side angle line" and "second lead-in side angle line" refer to lateral sides located at both sides of the crest. The "transition line" is named as "R-type arc". The "R-type thread" refers to a thread having a thread form formed by connecting the first lead-in side angle line, the second lead-in side angle line, and the transition line. A "R-type face" is a root of the R-type thread.

The R-type thread provided by the present application is distinguished from the existing standard threads in the following several aspects: 1. an R-type internal (external) thread is designed to have an R-type face at a root of the internal (external) thread, wherein when an external (internal) thread is pre-tensioned mutually with the R-type internal (external) thread, the tooth tip of the external (internal) thread slightly adducts to bear against the R-type face, in this way, the tooth tip of the external (internal) thread can be effectively protected, which is not like the 30° wedge-shaped thread that generates a very large side force to damage the thread; 2. when the external (internal) thread is screwed up mutually with the R-type internal (external) thread, the tooth tip of the external thread bears tightly against the R-type face, so as to generate a very large locking force. Due to the R-shape structure, a normal force, which is generated by contact and applied between the threads, and a bolt axis are made to be supported partially by the R-type face, which is not like a metric thread or a US standard thread where it is supported by 30° angle, or an inch thread where it is supported by 27.5° angle; 3. the R-type face has better stress transmission with the force capable of being effectively applied to bodies of the internal and external threads, wherein the R-type internal (external) thread has a normal pressure much greater than a fastening pressure, therefore, the generated anti-loose friction force will be inevitably increased significantly; 4. at the same time, when a crest of the metric, US standard, or inch external (internal) thread is engaged with the R-type internal (external) thread, a tooth tip at the crest is easy to contract, to make a load uniformly distributed on the whole length of the contacted helical line, while when the common standard threads are engaged, more than 80% of the total load is concentrated on thread flanks of a first tooth and a second tooth.

To sum up, an R-type thread coupling pair not only overcomes the defect of the common standard coupling pair of being easy to automatically loosen in a vibration condition, but also prolongs the service life.

Further, the transition line is an arc line.

The arc line can reduce the non-effective stress of the internal and external threads, and increase the external force needed for loosening the thread, achieving the purpose of anti-looseness.

Further, the transition line is formed by connecting a plurality of straight lines, a cross angle between the adjacent line-segments ranging from 90° to 180°.

It should be indicated that the "cross angle" herein refers to the angle toward the tooth tip. The transition line may be in an arc shape, or formed by connecting a plurality of line-segments, also capable of realizing the function of automatically preventing looseness.

Further, the transition line is formed by connecting a plurality of curves.

The transition line is preferably an arc line. The transition line formed by connecting a plurality of curves has the same effect as the transition line of the arc line.

Further, an intersection point between the transition line and the first lead-in side angle line is a first intersection point, and an intersection point between the transition line and the second lead-in side angle line is a second intersection point, wherein a connecting line between the first intersection point and the second intersection point is a connection line, and the connection line and the second lead-in side angle line are perpendicular to each other.

A positional relationship between a starting point and an ending point of the transition line is determined according to different specifications of threads, facilitating processing and manufacture, with more remarkable effect of anti-looseness.

Further, the first intersection point is located on a pitch diameter of the thread.

Determining the starting point and the ending point of the transition line and the lengths of the first lead-in side angle line and the second lead-in side angle line facilitates processing of the thread, and the anti-looseness effect is better.

Further, a thread angle of the thread tooth form is greater than or equal to 30°.

A thread angle of the thread form is greater than or equal to 30°.

The "thread angle" refers to an angle between both lateral sides of the thread tooth form in an axial section of the thread. An angle formed between the first lead-in side angle line and the second lead-in side angle line varies according to the matched external thread, and it is 60° when matched with a metric external thread and a US standard external thread, and 55° when matched with an inch external thread. When a triangular external thread such as metric external thread, US standard external thread, and inch external thread is screwed into the R-type internal thread provided by the present application, it can be easily screwed in along the second lead-in side angle line, and when being secured, the tooth tip of the external thread bears tightly against the R-type face, generating a very large locking force. The angle between both lateral sides of the thread tooth form is greater than or equal to 30°, facilitating matching with threads of various specifications.

Further, a circular arc radius of the arc line is a thread pitch.

Determining the shape of the arc line facilitates processing of the thread, and the anti-looseness effect is better.

Further, an intersection point between the arc line and the first lead-in side angle line is a first intersection point, and an intersection point between the arc line and the second lead-in side angle line is a second intersection point, wherein a connecting line between the first intersection point and the second intersection point is a connection line, the connection line and the second lead-in side angle line are perpendicular to each other, and a center of a circle corresponding to the arc line is located on a perpendicular bisector of the connection line.

Precisely determining the shape of the arc shape facilitates practical processing and manufacture of the thread, and the anti-looseness effect is better.

Further, the first lead-in side angle line and the second lead-in angle line are both straight-line segments.

The internal thread and the external thread are ensured to be closely fitted, and the friction force and the effective stress are increased.

The beneficial effects of the present invention is: the present technical solution, overcoming the defect that the existing threads are easy to get loose after assembled, provides an R-type thread which has the functions of resisting vibration and looseness.

BRIEF DESCRIPTION OF THE DRAWINGS

For a more complete understanding, reference is now made to the following description taken in conjunction with the accompanying Drawings in which.

In order to more clearly illustrate technical solutions of examples of the present invention, figures which are needed for description of the examples will be introduced briefly below. It should be understood that the figures below merely show some examples of the present invention, and therefore should not be considered as limiting the scope. A person ordinarily skilled in the art still can obtain other relevant figures according to these figures, without paying inventive effort.

In the figures.

first lead-in side angle line 101; second lead-in side angle line 102; transition line 103; arc line 104; line segment 105; curve 106; first intersection point 107; second intersection point 108; connection line 109; outer diameter 200; inner diameter 201; pitch diameter 202; perpendicular bisector 203; internal thread 204; external thread 205.

DETAILED DESCRIPTION

Referring now to the drawings, wherein like reference numbers are used herein to designate like elements throughout, the various views and embodiments of the R-type thread are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In order to make clearer the objects, the technical solutions, and the advantages of the examples of the present invention, below the technical solutions of the examples of the present invention will be described clearly and completely in conjunction with figures of the examples of the present invention. Apparently, some but not all of examples of the present invention are described. Generally, components in the examples of the present invention described and shown in the figures herein can be arranged and designed in different configurations.

Therefore, the detailed description below of the examples of the present invention provided in the figures is not intended to limit the protection scope of the present invention, but merely represents chosen examples of the present invention. Based on the examples of the present invention, all the other examples, which a person ordinarily skilled in the art obtains without paying inventive effort, fall within the scope of protection of the present invention.

It should be noted that similar reference signs and letters represent similar items in the following figures, therefore, once a certain item is defined in one figure, it is not needed to be further defined and explained in subsequent figures.

In the description of the present invention, it should be indicated that terms "first", "second" etc. are merely for describing the distinction, but should not be construed as indicating or suggesting the importance in the relativity.

In the description of the present invention, it also should be indicated that unless otherwise specified and defined, terms "arrangement" and "connection" should be understood widely, for example, it may be a fixed connection, a detachable connection, or an integrated connection; it may be a mechanical connection, or an electrical connection; it may be a direct connection, or an indirect connection through an intermediate medium; and it also may be an inner communication between two elements. For a person ordinarily skilled in the art, the specific meanings of the above mentioned terms in the present invention can be understood according specific circumstances.

Example 1 is based on FIG. 1 to FIG. 3, and FIG. 6 to FIG. 10.

Figure 1:
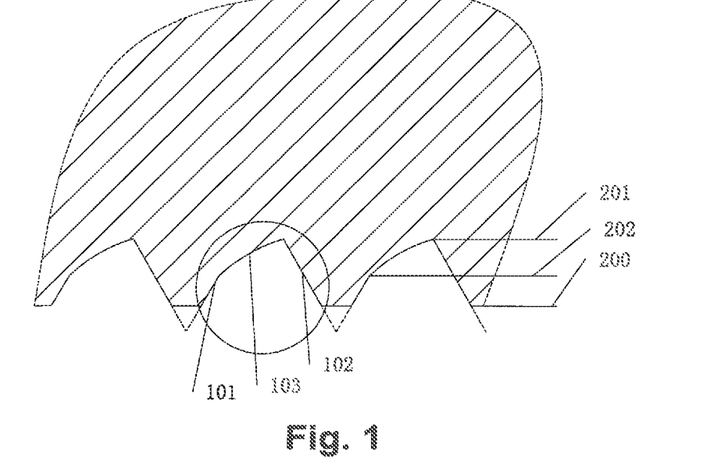
FIG. 1 is a schematic diagram of a thread tooth form provided by the present invention.
Figure 3:
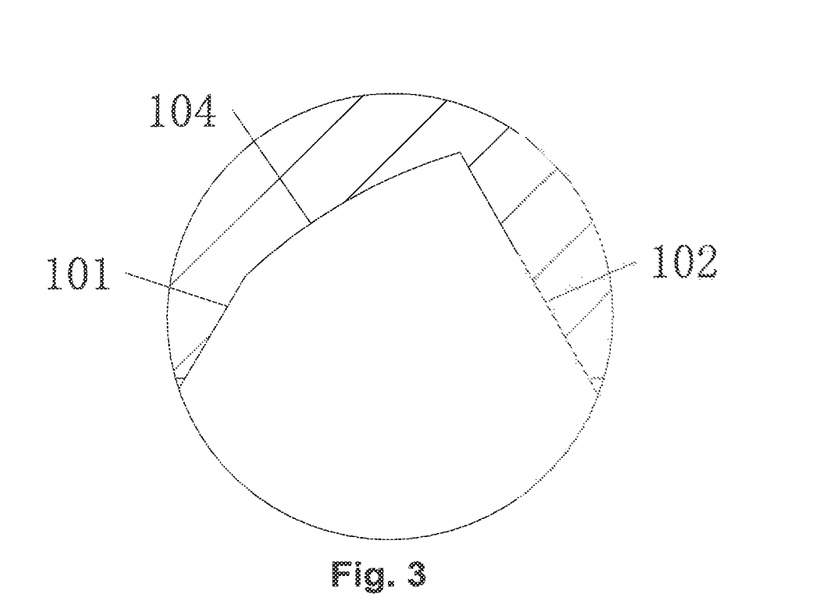
FIG. 3 is a schematic diagram of a first structure of the thread tooth form provided by the present invention.

As shown in FIG. 1 and FIG. 3, in the R-type thread provided by the present example, both lateral sides of a thread tooth form are a first lead-in side angle line 101 and a second lead-in side angle line 102 respectively, the first lead-in side angle line 101 and the second lead-in side angle line 102 are connected through a transition line 103, and the transition line 103 is concaved in a direction away from a crest of the tooth.

It should be indicated that the "thread tooth form" determines a geometrical shape of a thread, including diameters (outer diameter, pitch diameter, and inner diameter) of a workpiece, with main parameters such as a thread tooth angle, a tooth oblique angle, pitch, helical angle, number of starts and so on. The "first lead-in side angle line 101" and the "second lead-in side angle line 102" refer to lateral sides located at both sides of the crest. The "transition line 103" is named as an "R-type arc". The "R-type thread" refers to a thread having a thread tooth form formed by connecting the first lead-in side angle line 101, the second lead-in side angle line 102, and the transition line 103. The "R-type face" is a tooth root of the R-type thread.

Figure 10:
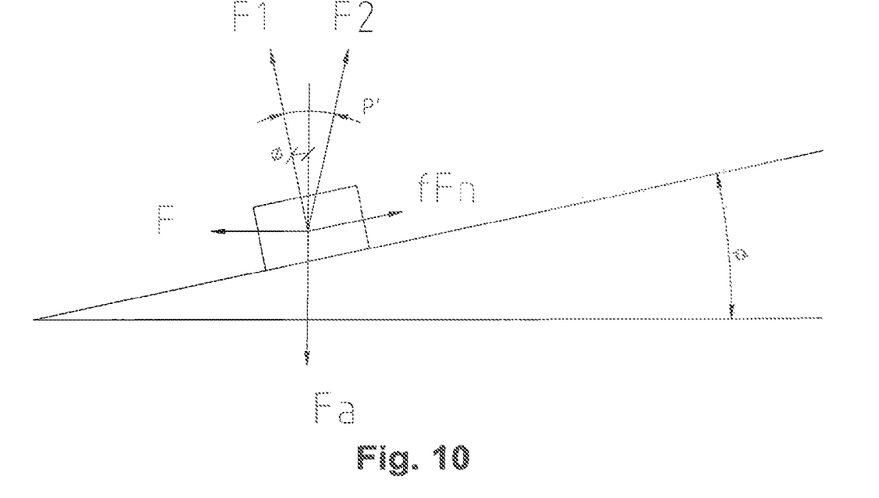
FIG. 10 is a schematic diagram of stress analysis after the internal threads and the external threads are assembled.

A thread pair makes a relative movement under the effect of a torque and an axial load, which can be considered as the situation that a horizontal force which acts on the pitch diameter pushes a slide block to move along the thread. As shown in FIG. 10, F is an external force, F1 is a normal reaction force, fFn is a friction force, Fa is an axial load, Φ is a lead angle, $p'$ is an equivalent friction angle, F2 is a total reaction force, and β is an angle between a force-bearing point of the internal thread 204 and a perpendicular line of a thread axis. For a triangular thread, a force analysis is made when the slide block slides at a constant speed along a bevel, to obtain:

$$F=Fa*tg(p'-\varphi, p'=arctgf \cos \beta, i.e. \ F=Fa*tg(arctgf \cos \beta-\varphi).$$

When Fa is the same, the greater the value of β, the greater the value of F. the R-type thread has the advantage of breaking through a single angle. We can see from analysis of points taken from a force-bearing surface that the angle β between any force-bearing point and the perpendicular line of the thread axis of the R-type thread is greater than a value of β of a force-bearing surface of a common internal thread 204, and as a result, the external force F needed for loosening the anti-loose internal thread 204 is much greater than that for a common thread. Therefore, the R-type thread has very good anti-loose effects.

The problem that uneven force is exerted onto the common thread also can be eliminated because tooth tips of the internal and external thread 205 are in close contact with the R-type face when the R-type thread is locked. When the common internal and external threads 205 are screwed together, the force is mainly exerted to the places where a first turn and a second turn of thread of a nut are in contact with the external thread 205, while the remaining teeth bear a small force. When the R-type thread is screwed, all of tooth tips of respective teeth of the matched threads bear tightly against the R-type arc, forming a helical-line contact, moreover, the load born by each tooth on the helical line is effectively transferred to the internal and external threads 205, allowing to resist lateral vibration and effectively protect the internal and external threads 205, According to the above mentioned analyses, it can be deducted that the R-type thread provided by the present application is distinguished from the existing standard threads in the following several aspects as shown in FIG. 6, FIG. 7, FIG. 8, and FIG. 9: 1. an R-type internal (external) thread is designed to have an R-type face at a root of the internal (external) thread, wherein when the external (internal) thread is pre-tensioned mutually with the R-type internal (external) thread, the tooth tip of the external (internal) thread slightly adducts to bear against the R-type face, in this way, the tooth tip of the external (internal) thread can be effectively protected, which is not like a 30° wedge-shaped thread which generates a very large side force to damage the thread; 2. when the external (internal) thread is screwed up mutually with the R-type internal (external) thread, the tooth tip of the external thread 205 bears tightly against the R-type face, so as to generate a very large locking force. Due to the R-shape structure, a normal force, which is generated by contact and applied between the threads, and a bolt axis are made to be supported partially by the R-type face, which is not like a metric thread or a US standard thread where it is supported by a 30° angle, or an inch thread where it is supported by a 27.5° angle; 3. the R-type face has better stress transmission, with the force effectively applied to bodies of the internal and external threads 205, and the R-type internal (external) thread has a normal pressure much greater than a fastening pressure, therefore, the generated anti-loose friction force is inevitably increased significantly; 4. at the same time, when a crest of the metric, US standard, or inch external (internal) thread is engaged with the R-type internal (external) thread, a tooth tip at the crest is easy to contract, to make the load uniformly distributed onto the whole length of the contacted helical line, while when the common standard threads are engaged, more than 80% of the total load is concentrated on thread flanks of a first tooth and a second tooth.

To sum up, the R-type thread provided by the present application has the following advantages: 1. it has reliable performances of vibration resistance and looseness resistance; 2. it can significantly improve the service life of fasteners; 3. it can achieve the purpose of anti-looseness without any auxiliary locking elements, such as a spring pad, a stop washer and the like; 4. it can achieve the purpose of anti-looseness regardless of dramatic change of temperature, and has a wide range of application circumstances; 5. it is matched with the standard metric, US standard, and inch external thread 205; 6. it has a remarkable effect in overcoming stripping problems of soft materials (for example, copper material, aluminium alloy and the like); 7. a torque is not needed until screw-up, facilitating disassembly; and 8. it can be made as left-handed or right-handed according to requirements in use.

In the present example, the transition line 103 is preferably an arc line 104. The arc line 104 can reduce the non-effective stress of the internal and external threads, and can increase the external force needed for loosening the thread, achieving the purpose of anti-looseness. The first lead-in side angle line 101 and the second lead-in angle line 102 of the R-type thread provided by the present application are both straight-line segments, ensuring close fitting of the internal thread 204 and the external thread 205, and increasing the friction force and the effective stress.

Figure 2:
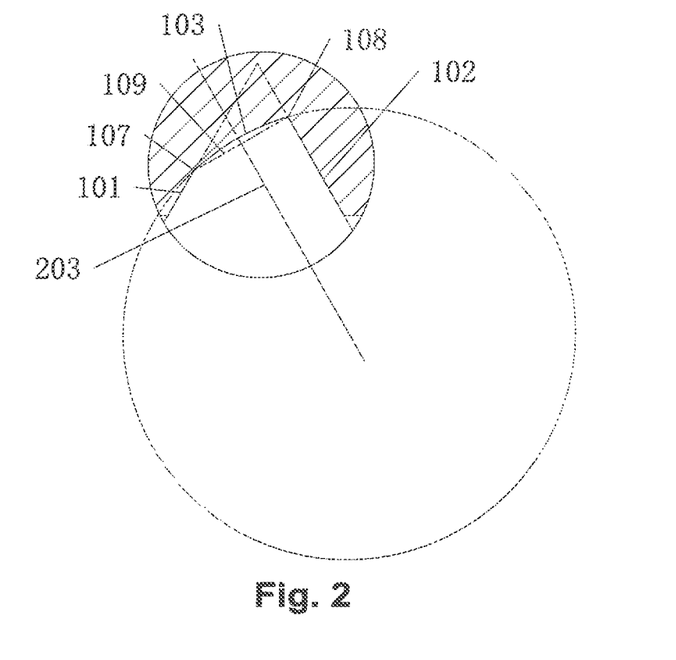
FIG. 2 is a structural schematic diagram of a geometrical relationship of the thread tooth form as shown in FIG. 1.

In the above, as shown in FIG. 2, a circular arc radius of the arc line 104 is a thread pitch. Determining the shape of the arc line 104 facilitates the thread processing. Further precisely determining the shape of the arc shape facilitates the practical processing and manufacture of the thread. An intersection point between the arc line 104 and the first lead-in side angle line 101 is a first intersection point 107, and an intersection point between the arc line 104 and the second lead-in side angle line 102 is a second intersection point 108. A connecting line between the first intersection point 107 and the second intersection point 108 is a connection line 109. The connection line 109 and the second lead-in side angle line 102 are perpendicular to each other. A center of a circle corresponding to the arc line 104 is located on a perpendicular bisector 203 of the connection line 109.

As shown in FIG. 2, the first intersection point 107 is located on the pitch diameter of the thread. Processing of the thread is facilitated by determining a starting point and an ending point of the transition line 103 and the lengths of the first lead-in side angle line 101 and the second lead-in side angle line 102.

A thread angle of the thread tooth form is greater than or equal to 30°. The "thread angle" refers to an angle between both lateral sides of the thread tooth form in an axial section of the thread. An angle formed between the first lead-in side angle line 101 and the second lead-in side angle line 102 varies according to the matched external thread 205, and it is 60° when matched with a metric external thread and a US standard external thread 205, and 55° when matched with an inch external thread 205. When a triangular external thread 205, such as a metric external thread, a US standard external thread, an inch external thread and the like, is screwed into the R-type internal thread 204 provided by the present application, it can be easily screwed-in along the side of the second lead-in side angle line 102, and when being secured, the tooth tip of the external thread 205 bears tightly against the R-type face, generating a very large locking force. The angle between both lateral sides of the thread tooth form is greater than or equal to 30°, facilitating matching with threads of various specifications.

Figure 4:
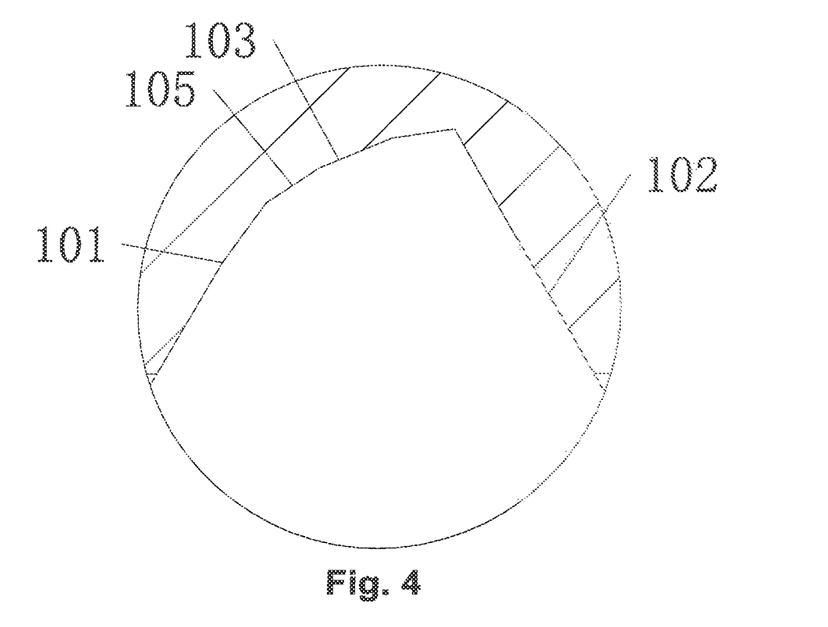
FIG. 4 is a schematic diagram of a second structure of the thread tooth form provided by the present invention.
Figure 5:
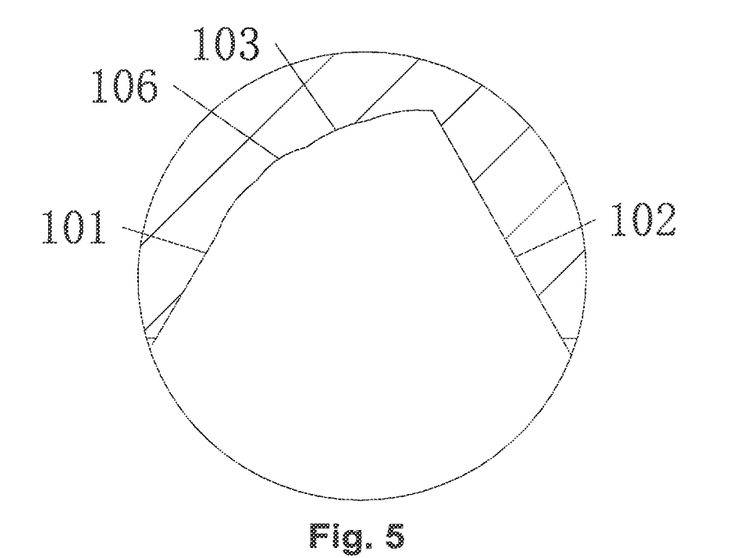
FIG. 5 is a schematic diagram of a third structure of the thread tooth form provided by the present invention.
Figure 6:
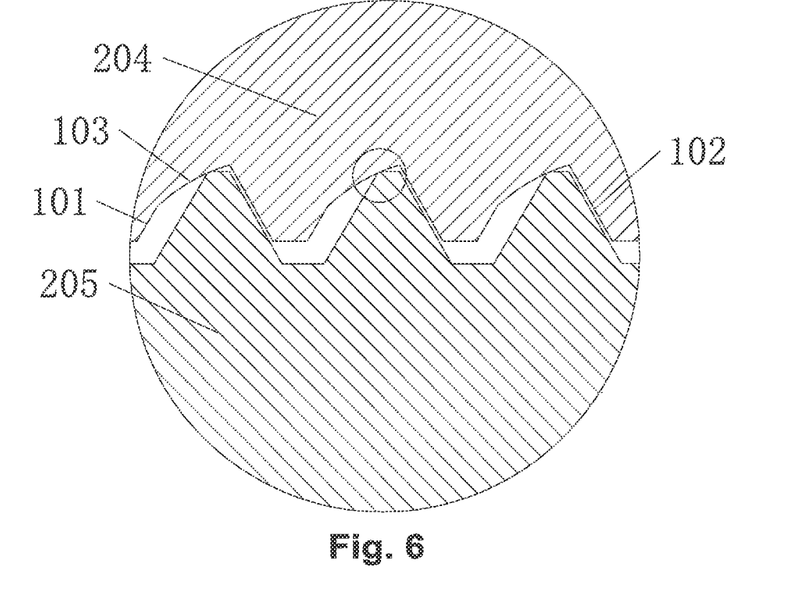
FIG. 6 is a structural schematic diagram of assembly of the thread tooth form provided by the present invention and triangular threads.
Figure 7:
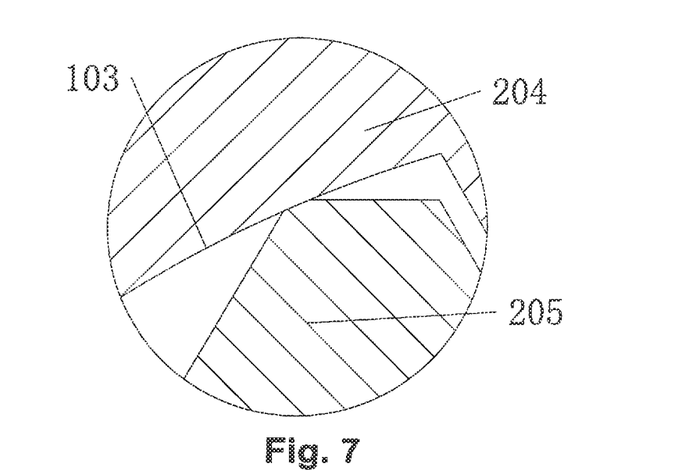
FIG. 7 is a partial enlarged view of FIG. 6.
Figure 8:
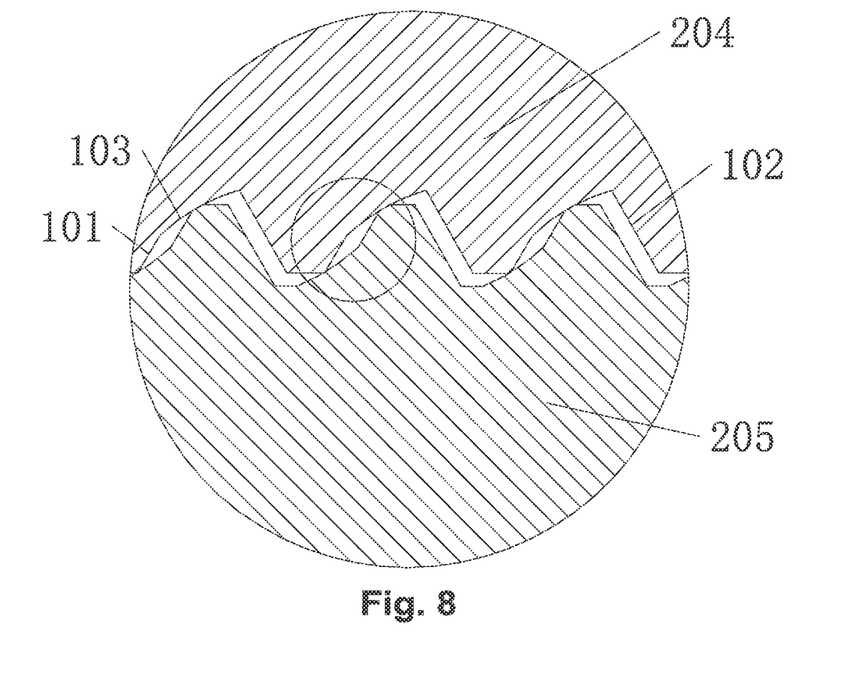
FIG. 8 is a structural schematic diagram of assembly of internal threads and external threads of the thread tooth form provided by the present invention.
Figure 9:
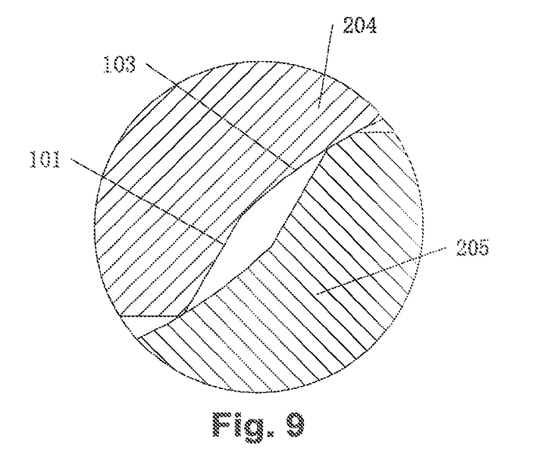
FIG. 9 is a partial enlarged view of FIG. 8.

Example 2 is based on FIG. 4 and FIG. 5.

As shown in FIG. 4 and FIG. 5, the transition line 103 of the R-type thread provided by the present application also may be formed by connecting a plurality of line segments 105, a cross angle between adjacent line segments ranging from 90° to 180°. It should be indicated that the "cross angle" herein refers to the angle toward the crest. Alternatively, the transition line is formed by connecting a plurality of curves 106. The transition line 103 may be in an arc shape, and also may be formed by connecting a plurality of line segments 105, also capable of realizing the function of automatically preventing looseness. The transition line 103 is preferably an arc line 104. The transition line 103 formed by connecting a plurality of curves 106 has the same effect as the transition line 103 of the arc line 104.

At this time, a positional relationship between a starting point and an ending point of the transition line 103 is determined according to different specifications of threads, facilitating processing and manufacture. An intersection point between the transition line 103 and the first lead-in side angle line 101 is a first intersection point 107, and an intersection point between the transition line 103 and the second lead-in side angle line 102 is a second intersection point 108. A connecting line between the first intersection point 107 and the second intersection point 108 is a connection line 109. The connection line 109 and the second lead-in side angle line 102 are perpendicular to each other.

In the above, the first intersection point 107 is located on the pitch diameter of the thread. Processing of the thread is facilitated by determining the starting point and the ending point of the transition line 103 and the lengths of the first lead-in side angle line 101 and the second lead-in side angle line 102.

An outer diameter 200 is a diameter of an imaginary cylinder overlapped with a crest of an external thread or a root of an internal thread. An inner diameter 201 is a diameter of an imaginary cylinder overlapped with a root of an external thread or a crest of an internal thread. A pitch diameter 202 is a diameter of an imaginary cylinder whose generatrix passes through a ridge and a groove with an equal width on a thread form.

An angle between both lateral sides of the thread tooth form is greater than or equal to 30°. An angle formed between the first lead-in side angle line 101 and the second lead-in side angle line 102 varies according to a matched external thread 205, and it is 60° when matched with a metric external thread and a US standard external thread 205, and 55° when matched with an inch external thread 205. When the triangular external thread 205 such as a metric external thread, a US standard external thread, and an inch external thread is screwed into the R-type internal thread 204 provided by the present application, it can be easily screwed-in along the side of the second lead-in side angle line 102, and during being secured, the tooth tip of the external thread 205 bears tightly against the R-type face, generating a very large locking force. The angle between both lateral sides of the thread tooth form is greater than or equal to 30°, facilitating matching with threads of various specifications.

The above is merely for preferable examples of the present invention and not used to limit the present invention. For one skilled in the art, various modifications and changes may be made to the present invention. Without departing from the spirit and principle of the present invention, any amendments, equivalent replacements, improvements and so on should fall within the scope of protection of the present invention.

What is claimed is:

1. An apparatus, comprising:
an R-type thread, wherein both lateral sides of a thread tooth form are a first lead-in side angle line and a second lead-in side angle line respectively, the first lead-in side angle line and the second lead-in side angle line connected through a transition line, and the transition line concaved in a direction away from a crest, wherein the R-type thread is an internal thread, and when an external thread is meshed with the R-type thread, a tooth tip of the external thread is able to bear against and match with a transition surface corresponding to the transition line;
wherein the transition line is an arc line, a circular arc radius of the arc line is a thread pitch, an intersection point between the arc line and the first lead-in side angle line is a first intersection point, and an intersection point between the arc line and the second lead-in side angle line is a second intersection point, wherein a connecting line between the first intersection point and the second intersection point is a connection line, the connection line and the second lead-in side angle line are perpendicular to each other, and a center of a circle corresponding to the arc line is located on a perpendicular bisector of the connection line.

2. The apparatus according to claim 1, wherein the transition line is formed by connecting a plurality of line segments, a cross angle between adjacent line segments ranging from 90° to 180°.

3. The apparatus according to claim 2, wherein an intersection point between the transition line and the first lead-in side angle line is a first intersection point, and an intersection point between the transition line and the second lead-in side angle line is a second intersection point, wherein a connecting line between the first intersection point and the second intersection point is a connection line, and the connection line and the second lead-in side angle line are perpendicular to each other.

4. The apparatus according to claim 2, wherein a thread angle of the thread tooth form is greater than or equal to 30°.

5. The apparatus according to claim 1, wherein the transition line is formed by connecting a plurality of curves.

6. The apparatus according to claim 5, wherein an intersection point between the transition line and the first lead-in side angle line is a first intersection point, and an intersection point between the transition line and the second lead-in side angle line is a second intersection point, wherein a connecting line between the first intersection point and the second intersection point is a connection line, and the connection line and the second lead-in side angle line are perpendicular to each other.

7. The apparatus according to claim 5, wherein a thread angle of the thread tooth form is greater than or equal to 30°.

8. The apparatus according to claim 1, wherein an intersection point between the transition line and the first lead-in side angle line is a first intersection point, and an intersection point between the transition line and the second lead-in side angle line is a second intersection point, wherein a connecting line between the first intersection point and the second intersection point is a connection line, and the connection line and the second lead-in side angle line are perpendicular to each other.

9. The apparatus according to claim 8, wherein the first intersection point is located on a pitch diameter of the thread.

10. The apparatus according to claim 1, wherein an intersection point between the transition line and the first lead-in side angle line is a first intersection point, and an intersection point between the transition line and the second lead-in side angle line is a second intersection point, wherein a connecting line between the first intersection point and the second intersection point is a connection line, and the connection line and the second lead-in side angle line are perpendicular to each other.

11. The apparatus according to claim 1, wherein a thread angle of the thread tooth form is greater than or equal to 30°.

12. The apparatus according to claim 1, wherein a thread angle of the thread tooth form is greater than or equal to 30°.

13. The apparatus according to claim 1, wherein the first lead-in side angle line and the second lead-in angle line are both straight-line segments.

* * * * *